United States Patent
Ye et al.

(10) Patent No.: US 11,350,449 B2
(45) Date of Patent: May 31, 2022

(54) FREQUENCY HOPPING FOR UNLICENSED INTERNET OF THINGS

(71) Applicant: Apple Inc., Cupertino, CA (US)

(72) Inventors: Qiaoyang Ye, Fremont, CA (US); Huaning Niu, San Jose, CA (US); Wenting Chang, Beijing (CN)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 16/328,456

(22) PCT Filed: Sep. 29, 2017

(86) PCT No.: PCT/US2017/054400
§ 371 (c)(1),
(2) Date: Feb. 26, 2019

(87) PCT Pub. No.: WO2018/064525
PCT Pub. Date: Apr. 5, 2018

(65) Prior Publication Data
US 2021/0289547 A1  Sep. 16, 2021

Related U.S. Application Data
(60) Provisional application No. 62/401,704, filed on Sep. 29, 2016.

(51) Int. Cl.
*H04W 4/00* (2018.01)
*H04W 74/08* (2009.01)
(Continued)

(52) U.S. Cl.
CPC ......... *H04W 74/0808* (2013.01); *G16Y 10/75* (2020.01); *H04B 1/7156* (2013.01);
(Continued)

(58) Field of Classification Search
CPC ............. H04W 74/0808; H04W 28/26; H04W 72/0453; H04W 72/1289; H04W 4/70;
(Continued)

(56) References Cited

U.S. PATENT DOCUMENTS

| 9,326,157 B1 * | 4/2016 | Bhorkar | H04W 72/042 |
| 2012/0307869 A1 * | 12/2012 | Charbit | H04B 1/715 |
| | | | 375/132 |

(Continued)

FOREIGN PATENT DOCUMENTS

GB  2493986 A  2/2013

OTHER PUBLICATIONS

International Search Report and Written Opinion dated Dec. 7, 2017 for PCT Application PCT/US2017/054400.
(Continued)

*Primary Examiner* — Stephen M D Agosta
(74) *Attorney, Agent, or Firm* — Eschweiler & Potashnik, LLC

(57) ABSTRACT

Downlink transmissions can be generated to schedule one or more Internet of Things (IoT) devices for communication on unlicensed channels via frequency hopping operations/procedures. An evolved NodeB (eNB) or a next generation NodeB (gNB) can perform a listen before talk (LBT) on the unlicensed channels that are scheduled for transmission by at least one of: one or more IoT devices or one or more user equipments (UEs). A preamble or a common physical downlink control channel (CPDCCH) can be transmitted to reserve the unlicensed channels for the IoT devices/UEs. The preamble or the PDCCH can include a duration of the duration to provide notice to other eNBs/gNBs or trigger the IoT devices of a successful LBT corresponding to the unlicensed channels.

23 Claims, 7 Drawing Sheets

(51) Int. Cl.
  *G16Y 10/75* (2020.01)
  *H04B 1/7156* (2011.01)
  *H04L 5/00* (2006.01)
  *H04W 28/26* (2009.01)
  *H04W 72/04* (2009.01)
  *H04W 72/12* (2009.01)

(52) U.S. Cl.
  CPC .......... *H04L 5/0048* (2013.01); *H04W 28/26* (2013.01); *H04W 72/0453* (2013.01); *H04W 72/1289* (2013.01)

(58) Field of Classification Search
  CPC ............. H04W 16/14; H04W 72/0446; H04W 72/042; H04W 56/001; G16Y 10/75; H04B 1/7156; H04B 1/7143; H04B 1/7136; H04B 2001/71563; H04B 1/715; H04L 5/0048; H04J 11/0023; H04J 11/0069; H04J 11/0073; H04J 11/0076; H04J 13/0062; H04J 3/00; H04J 1/065
  See application file for complete search history.

(56) References Cited

U.S. PATENT DOCUMENTS

| | | | |
|---|---|---|---|
| 2015/0373702 A1* | 12/2015 | Merlin | H04W 72/0446 370/329 |
| 2016/0119019 A1* | 4/2016 | Pratt | H04B 1/525 370/278 |
| 2017/0048880 A1* | 2/2017 | Anderson | H04W 72/1226 |
| 2017/0289937 A1* | 10/2017 | Urabayashi | H04W 48/16 |
| 2017/0295576 A1* | 10/2017 | Fukuta | H04W 16/14 |
| 2017/0339717 A1* | 11/2017 | Futaki | H04W 72/0413 |
| 2018/0062698 A1* | 3/2018 | Wang | H04B 1/7143 |
| 2018/0070243 A1* | 3/2018 | Liu | H04W 4/70 |
| 2018/0309479 A1* | 10/2018 | Yerramalli | H04L 5/0012 |
| 2019/0059102 A1* | 2/2019 | Yerramalli | H04L 1/1816 |
| 2019/0215811 A1* | 7/2019 | Mukherjee | H04B 1/713 |
| 2019/0239059 A1* | 8/2019 | Koorapaty | H04W 56/001 |
| 2020/0259896 A1* | 8/2020 | Sachs | G06K 19/06028 |
| 2021/0250932 A1* | 8/2021 | Liu | H04W 72/044 |
| 2021/0289547 A1* | 9/2021 | Ye | G16Y 10/75 |
| 2021/0297985 A1* | 9/2021 | Liu | H04W 16/14 |

OTHER PUBLICATIONS

"Discussion on issues related to UL transmission in LAA." Source: NTT Docomo, Inc. Agenda Item: 7.2.4.2. 3GPP TSG RAN WG1 Meeting #80bis, Belgrade, Serbia, Apr. 20-24, 2015. R1-151958. 6 pages.

"Uplink transmission for LAA." Source: Intel Corporation. Agenda Item: 7.1.3. 3GPP TSG-RAN WG2 Meeting #90, Fukuoka, Japan, May 25-29, 2015. R2-152214. 6 pages.

* cited by examiner

FREQUENCY HOPPING FOR UNLICENSED INTERNET OF THINGS

REFERENCE TO RELATED APPLICATIONS

This application is a National Phase entry application of International Patent Application No. PCT/US2017/054400 filed Sep. 29, 2017, which claims priority to U.S. Provisional Application No. 62/401,704 filed Sep. 29, 2016, entitled "FREQUENCY HOPPING FOR UNLICENSED INTERNET OF THINGS" in the name of Qiaoyang Ye et al. and is hereby incorporated by reference in their entirety.

FIELD

The present disclosure relates to wireless technology, and more specifically to techniques for frequency hopping on an unlicensed spectrum for internet of things (IoT) communications.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

Additionally, the Internet of Things (IoT) is beginning to grow significantly, as consumers, businesses, and governments recognize the benefit of connecting devices to the internet. A significant segment of this industry is intended to operate over vast areas under the initiative low-power wide-area networking (LP-WAN), which is supposed to provide a global solution for both licensed and unlicensed spectrum. The following cellular technologies recently standardized in 3GPP are meant to operate in licensed spectrum: enhanced coverage global system for mobile communication (GSM) based on general packet radio service (GPRS) standard in the context of Rel-13; the evolution of the LTE machine type communication (MTC) solution (commonly called Cat M1) which is based on an evolution of the legacy Cat 0; and narrowband (NB) IoT, a new non backward compatible radio access technology which is specifically optimized in order to satisfy the requirements required for typical IoT solutions (commonly called Cat NB1).

In the recent years several proprietary technologies have been developed to operate in the unlicensed spectrum. These technologies, however, do not allow operators to leverage the investments done for the deployment of LTE, as many of them cannot easily interwork with existing networks and require separate deployments. IoT is envisioned as a significantly important technology component, which has huge potential and may change our daily life entirely by enabling connectivity between tons of devices. IoT has wide applications in various scenarios, including smart cities, smart environment, smart agriculture, and smart health systems.

3GPP has standardized two designs to support IoT services—enhanced Machine Type Communication (eMTC) and NarrowBand IoT (NB-IoT). As eMTC and NB-IoT UEs will be deployed in huge numbers, lowering the cost of these UEs is a key enabler for implementation of IoT. Also, low power consumption is desirable to extend the life time of the battery. In addition, there is a substantial use cases of devices deployed deep inside buildings which would require coverage enhancement in comparison to the defined LTE cell coverage footprint. In summary, eMTC and NB-IoT techniques are designed to ensure that the UEs have low cost, low power consumption and enhanced coverage.

DETAILED DESCRIPTION

Figure 1:
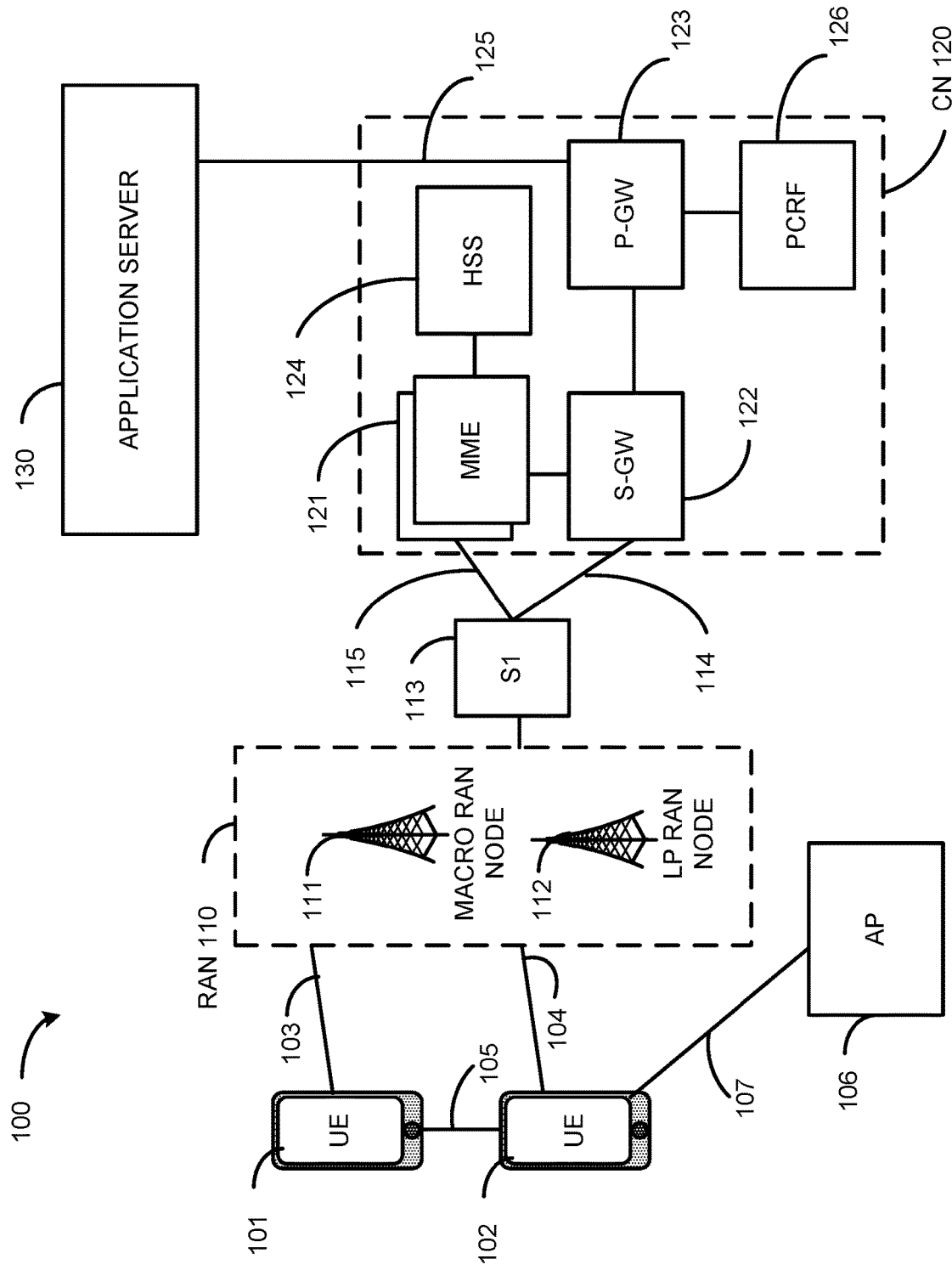
FIG. 1 is a block diagram illustrating an example user equipment (UE) useable in connection with various network component according to various aspects (embodiments) described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

Overview

In consideration of the above, various aspects/embodiments are disclosed for performing a listen before talk (LBT) operation on one or more unlicensed channels scheduled to an unlicensed internet of things (U-IoT) device to enable a frequency hopping operation for uplink (UL)/ downlink (DL) transmissions. The one or more unlicensed channels can be reserved for the U-IoT device to perform the frequency hopping operation based on the LBT. A conventional/common physical downlink control channel (CPDCCH) or a preamble that carries a transmission duration as a network allocation vector (NAV) can communicate a DL communication that indicates to the U-IoT device whether the one or more unlicensed channels is reserved for the frequency hopping operation.

Both Rel-13 eMTC and NB-IoT operates in the licensed spectrum. On the other hand, the scarcity of licensed spectrum in low frequency band results in a deficit in the data rate boost. Thus, there are emerging interests in the operation of LTE systems in unlicensed spectrum.

Potential LTE operation in unlicensed spectrum includes, but not limited to, the carrier aggregation based licensed assisted access (LAA)/enhanced LAA (eLAA) systems, LTE operation in the unlicensed spectrum via dual connectivity (DC), and the standalone LTE system in the unlicensed spectrum, where LTE-based technology solely operates in unlicensed spectrum without requiring an "anchor" in licensed spectrum—called MulteFire, a form or standard of LTE deployment in unlicensed frequency bands. MulteFire contrasts with LAA/LTE unlicensed that leverages both licensed and unlicensed spectrums in that it exclusively uses the unlicensed spectrums and allows MulteFire to be deployed by anyone, anywhere in a similar manner to Wi-Fi hotspots.

To extend the benefits of LTE IoT designs into unlicensed spectrum, MulteFire 1.1 is expected to specify the design for Unlicensed-IoT (U-IoT). As such, aspects/embodiments herein relate to U-IoT systems and devices.

The unlicensed frequency band of interest is the sub-1 GHz band and the ~2.4 GHz band for U-IoT, which has spectrum with global availability. The regulations are different for different regions and bands, e.g. different maximal channel bandwidth, LBT, duty cycling, frequency hopping and power limitations may be required. For example, in Europe, it is required to have either LBT or <0.1% duty cycle for Frequency Hopping Spread Spectrum (FHSS) modulation with channel BW no less than 100 kHz within 863-870 MHz, and for Digital Modulation with channel BW no greater than 100 kHz within 863-870 MHz.

The LBT procedure can ensure the co-existence with incumbent systems and other IoT devices. Thus, embodiments herein can relate to scenarios where the U-IoT system can perform the LBT procedure before transmissions. Similar to eMTC, frequency hopping can be supported in U-IoT to provide frequency diversity. Moreover, in some regions and unlicensed bands, the frequency hopping can use certain modulations. Thus, mechanisms/aspects are disclosed to support frequency hopping with LBT for U-IoT. An IoT/UE device can include a wireless device such as a mobile/ wireless phone, or machine device that is operable to communicate in a machine-to-machine (M2M) protocol, a MTC protocol, an IoT protocol such as an unlicensed IoT (U-IoT) communication, unlicensed narrowband (U-NB IoT) communication or the like, and can be applicable to communicate in any IoT related standard from EC-GSM-IoT to eMTC, or NB-IoT, for example. Such U-NB IoT devices can be primarily utilized as a device communicatively coupled in a cellular network to one or more eNBs. IoT devices can also be considered machines that operate on a low power network or a network with lower power than UEs on a cellular network such as a Low Power Wide Area (LPWA) network or a WiFi network with less (or in-frequent) communication flows with longer delays in-between than LTE networks, for example, than cellular devices or UEs that are not/different UE devices. IoT devices can include appliances, thermostats, light bulbs, door locks, fridges, cars, implants for RFID and pacemakers, or other non-processing devices or processing devices, for example. Additional aspects and details of the disclosure are further described below with reference to figures.

Embodiments described herein can be implemented into a system using any suitably configured hardware and/or software. FIG. 1 illustrates an architecture of a system 100 of a network in accordance with some embodiments for generating DRS communications in one or more DRS subframe configurations according to various aspects/embodiments described herein. The system 100 is shown to include a user equipment (UE) 101 and a UE 102. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE (or IoT device), which can comprise a network access layer designed for low-power IoT applications utilizing short-lived UE connections, and can be distinguished from cellular UEs or wireless cell devices alone as low power network devices as eMTC or NB-IoT UEs utilizing a low power network, for example, or MulteFire standards for communication. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells (e.g., macro RAN node 111), and one or more RAN nodes for providing femtocells, picocells, or network cells having smaller coverage areas, smaller user capacity, or higher bandwidth compared to macrocells (e.g., low power (LP) RAN node 112).

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 can be split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class identifier (QCI), which commences the QoS and charging as specified by the application server 130.

Figure 2:
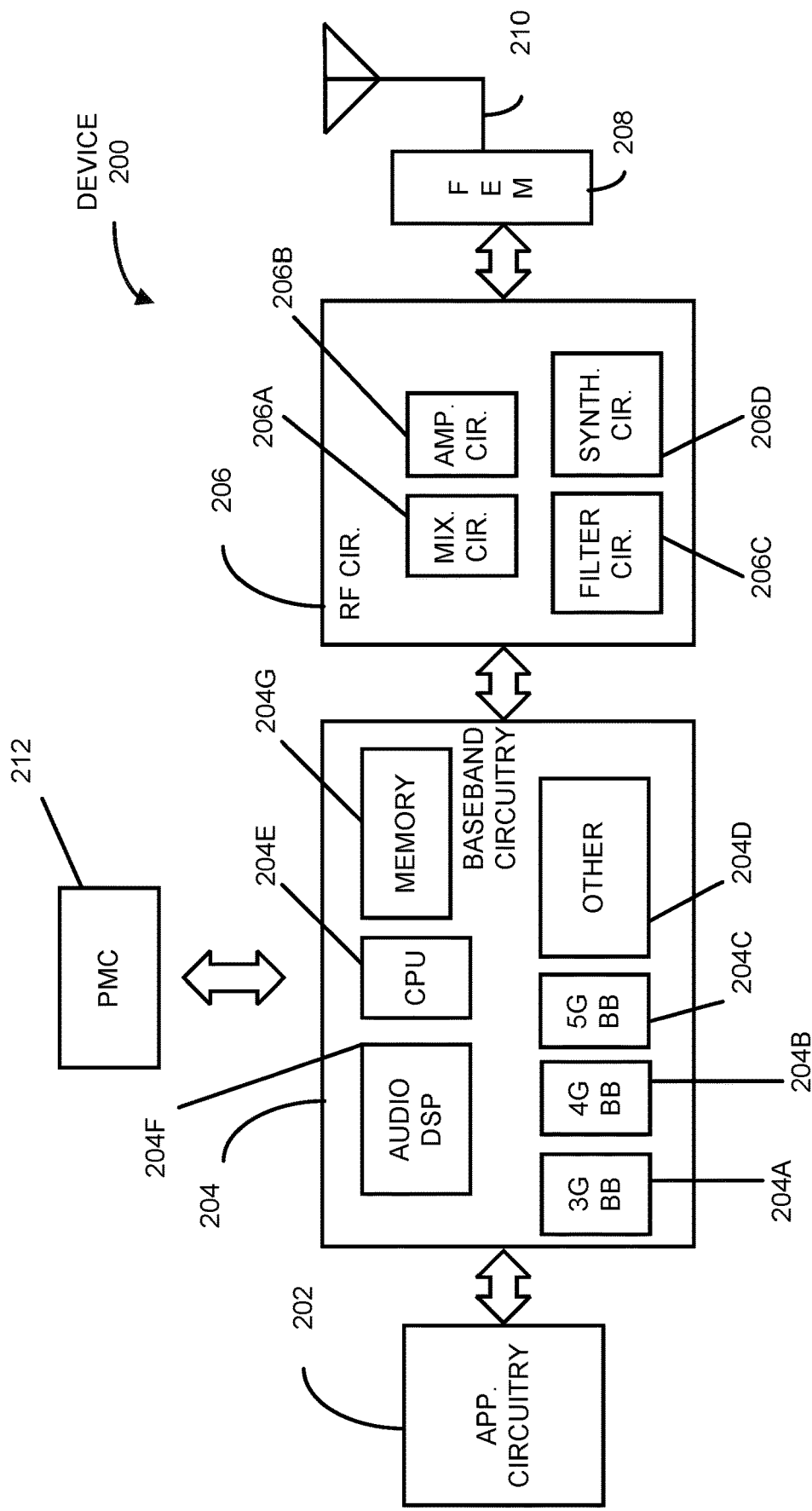
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a gNB, eNB, UE, a RAN node or other network device incorporating one or more various aspects/embodiments herein. In some embodiments, the device 200 can include less elements (e.g., a RAN node could not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components shown below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 illustrates the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 could not receive data in this state, and in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
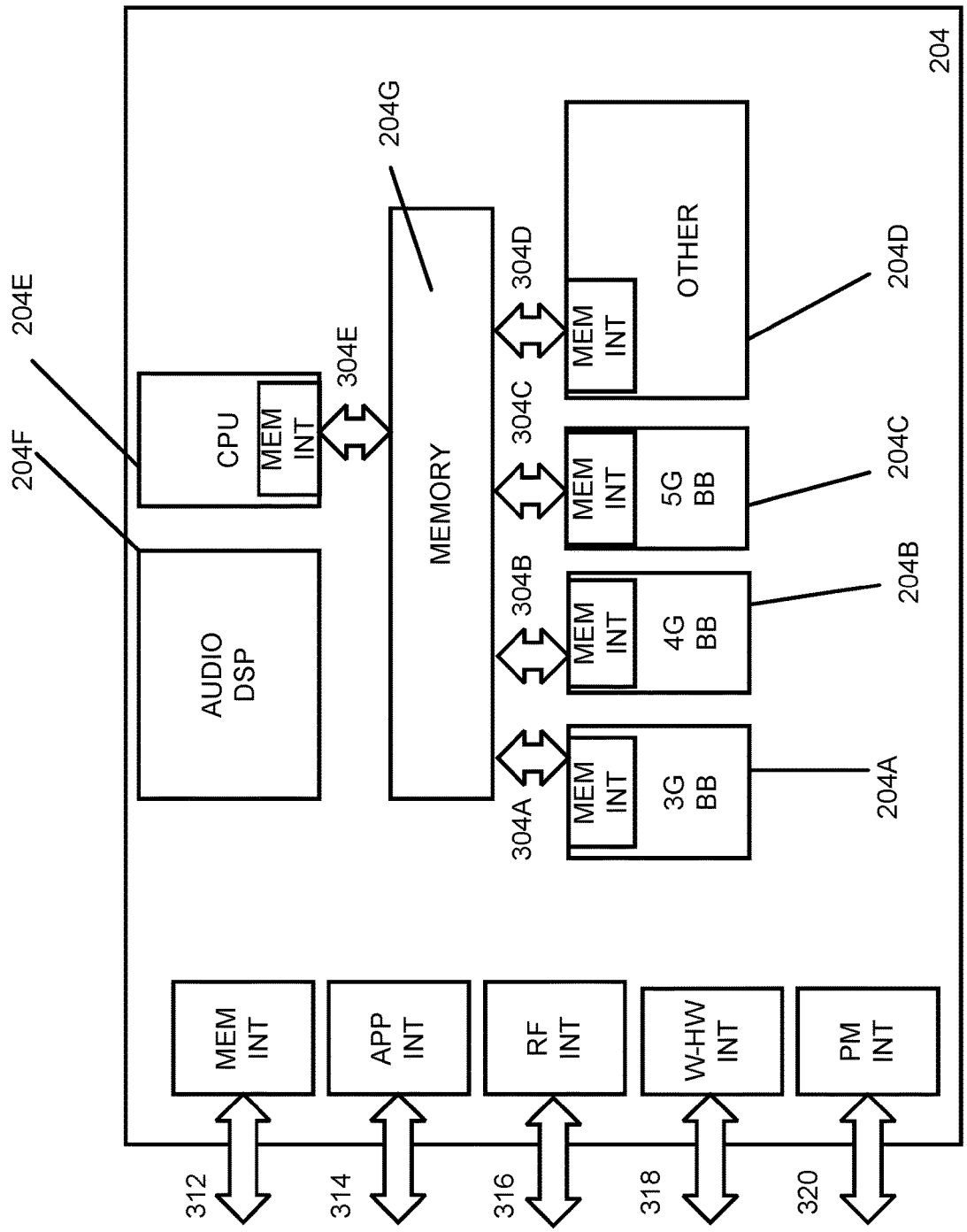
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
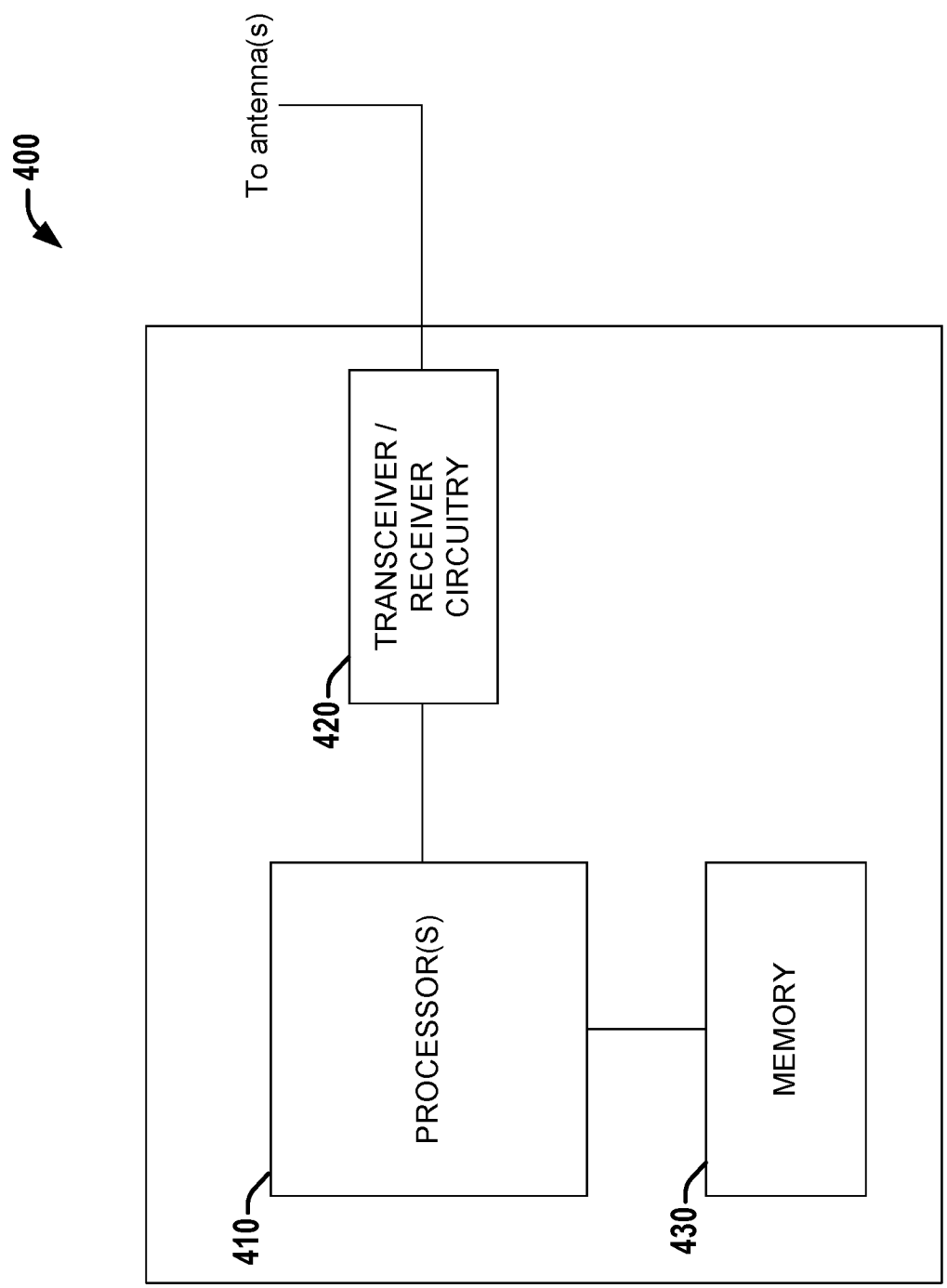
FIG. 4 is a block diagram illustrating a system employable at a UE that enables greater power efficiency for generating DRS communications in one or more DRS subframe configurations according to various aspects/embodiments described herein according to various aspects described herein.

Referring to FIG. 4, illustrated is a block diagram of a system or apparatus 400 employable at a user equipment (UE) or IoT device that can enable U-IoT frequency hopping according to various aspects/embodiments described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE) or IoT device, for example, a MTC/IoT UE. As described in greater detail below, system 400 can process/receive DRS communications in one or more DRS subframe configurations according to various aspects/embodiments described herein In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, and/or decoding.

In some embodiments, the system 400 as a UE or IoT device can perform a listen-before-talk (LBT) procedure on one or more channels (e.g., unlicensed spectrum/unlicensed channels) where the U-IoT UE 400 is scheduled to transmit on. Afterwards, the U-IoT UE can transmit on the one or more channels to an eNB (e.g., eNB 500).

The U-IoT UE 400 can then transmit on the one or more channels in consecutive subframes, for example, according to a frequency hopping pattern. This transmission can include sending a transmission duration to reserve the one or more channels. The transmission duration can be encoded via tail-biting convolutional code (TBCC) and a QPSK modulation. For example, the TBCC can be at a 1/3 rate along with a QPSK modulation.

The eNB (e.g., system 500 of FIG. 5) can also perform LBT on all channels that are scheduled for DL/UL transmissions, and reserve the channels for scheduled UEs. As such, to reserve the channels whose LBT succeeds, the eNB 500 can indicate the transmission duration (NAV) via preamble, and in response to receiving the preamble the U-IoT 400 can perform frequency hopping operations based on the transmission duration as a network allocation vector (NAV) derived from the preamble. The burst or transmission duration information can be encoded via TBCC at 1/3 rate and QPSK modulation as well, for example.

In one example, the preamble processed by the U-IoT UE 400 can span over one or multiple OFDM symbols, and can include one or more of a cell specific reference signals (CRS), channel state information reference signals (CSI-RS), demodulation Reference Signal (DMRS) signal, or one or more synchronization signals (e.g., a primary synchronization signal (PSS), a secondary synchronization signal (SSS), or the like). The preamble can be processed according to a resource element (RE) mapping of reference signals (RSs) based on a default Cell-ID (e.g., 0) or a default subframe index (e.g. 0).

As such, the PSS can be present in first symbol (or symbol location/index) of the preamble in the middle 6 resource blocks (RBs). The SSS can be present in second symbol of preamble in the middle 6RBs. Alternatively, or additionally, the PSS/SSS can be located in the symbols similarly to demodulation reference signals (DRS) in LAA systems (PSS at symbol 6 and SSS at symbol 5).

Alternatively, or additionally, the DL transmission being processed by the U-IoT UE 400 can include a defined conventional PDCCH (cPDCCH) that can include the transmission duration and be extended to be decodable by all nearby eNBs, which can perform blind detection of the CPDCCH over a network/cell-specific identifier (NID) and different hypothesis over scrambling for RS (e.g. CRS/CSI-RS/DMRS)/CPDCCH. The scrambling used for the CPDCCH or RSs can be based on a default Cell-ID UE (e.g., 0, or other NID) or a default subframe index.

In aspect, the information on the transmission duration can be in transmitted in terms of expected number of DL and UL subframes. The duration can be the total duration of the burst, or a subset of subframes, during which received eNBs should not transmit/perform LBT, for example. After the eNB successfully reserves the one or more unlicensed channels, the U-IoT UE 400 does not have to perform an LBT or single-shot LBT (i.e. no backoff) right before the transmission on scheduled channels, but instead can transmit based on the reservation or the duration indicated, for example. The preamble/CPDCCH can be used to transmit NAV and can be interpreted as the trigger to notify U-IoT UE 400 of the duration or which unlicensed channels to be used or have been reserved for use.

Before the start of first scheduled subframe, U-IoT UE 400 can perform LBT on all channels it will transmit during following duration of T, e.g. T can be the TxOP duration defined by the regulation. For channels where the LBT succeeds before the transmission, but the U-IoT UE 400 does not start transmitting on these channels immediately, the U-IoT UE 400 can send the NAV to reserve these channels. For channels where LBT succeeds before the transmission, but the U-IoT UE 400 does not start transmitting on these channels immediately, U-IoT UE 400 can also self-defer after the LBT, and perform no LBT or single-shot LBT right before the transmission on that channel. To perform a single-shot LBT, a gap could exist or be a part of the DL transmission for the Tx-Rx and Rx-Tx switching and the sensing duration.

In other aspects/embodiments, if only a subset of the channels is sensed to be "idle" (i.e., LBT succeeds), the following methods can be considered, separately or in combination, for U-IoT UE 400 transmission: alternative 1, if the LBT for at least one of the channels fails, the U-IoT UE 400 does not transmit on any of the channels; or alternative 2, the U-IoT UE 400 will transmit on the channels whose LBT is successful.

If the U-IoT UE 400 senses a channel to be busy, the U-IoT UE 400 can continuously keep sensing this channel until the total scheduled duration for that U-IoT UE 400 ends, or the scheduled duration for that U-IoT UE 400 on the sensed channel ends. The U-IoT UE 400 could stop sensing the channel, and stop transmission even it is scheduled for another channels in next few subframes, or start performing LBT on the channel that the U-IoT UE 400 is scheduled to hop to before corresponding scheduled subframes.

In another aspect, each scheduled U-IoT UE 400 can perform LBT on one or more channels, with the reserved channels being shared among scheduled U-IoT UE 400s. The channels that each U-IoT UE 400 could perform LBT when scheduled can be indicated by eNB in a UL grant, or semi-statically configured via higher layer signaling (e.g. radio resource control (RRC) signaling, or the like), for example.

Figure 5:
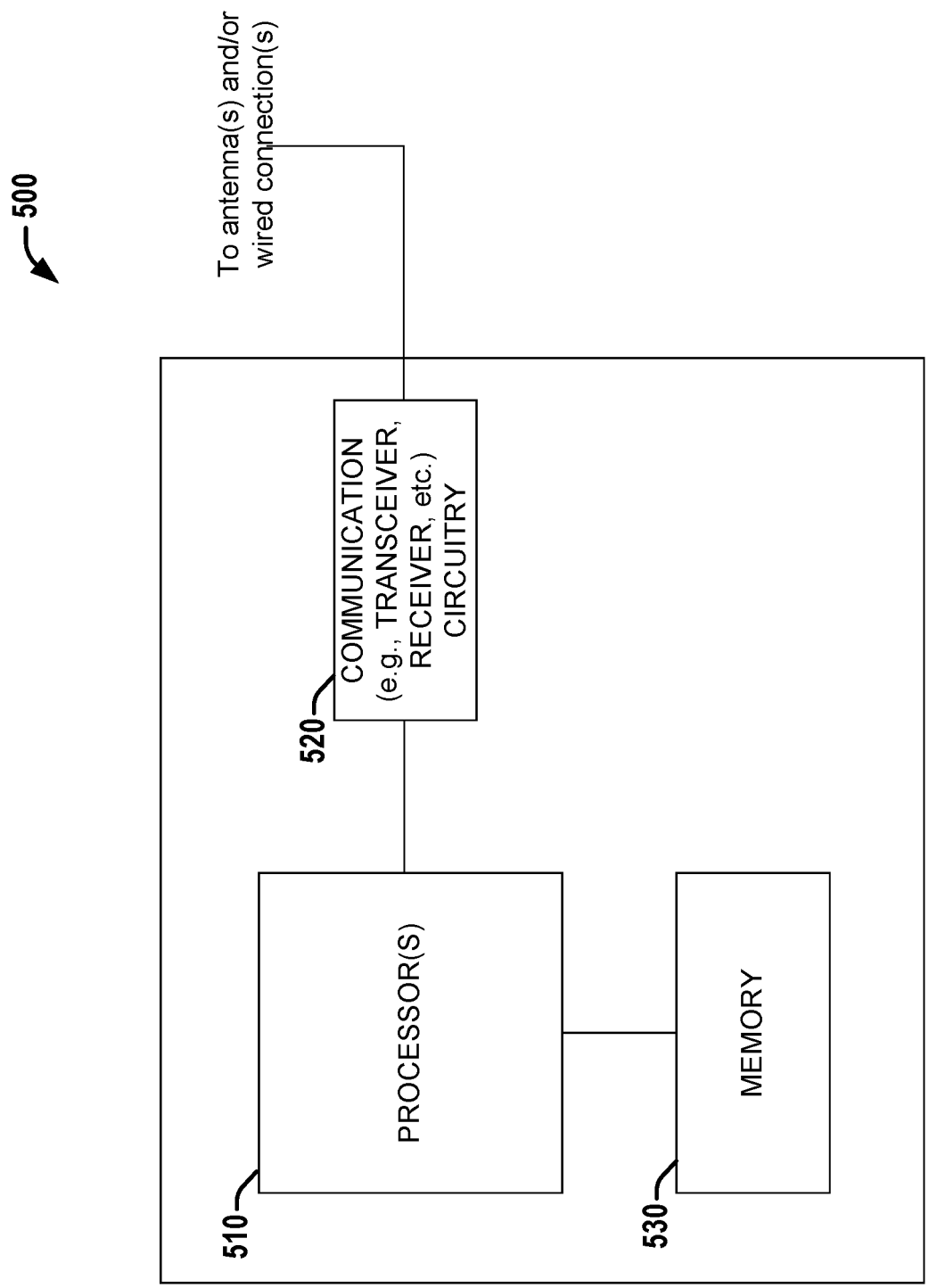
FIG. 5 is a block diagram illustrating a system employable at a base station (BS)/evolved NodeB (eNB)/new radio/next generation NodeB (gNB) that enables greater power efficiency for generating a DRS communications in one or more DRS subframe configurations according to various aspects/embodiments described herein, according to various aspects described herein.

Referring to FIG. 5, illustrated is a block diagram of a system or apparatus 500 employable at a BS (Base Station), gNB, eNB or other network device/component that facilitates enables improved coverage enhancement and opportunity for IoT devices to operate in the unlicensed spectrum with frequency hopping operations. System 500 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can facilitate/enable communications with U-IoT or eMTC devices with frequency hopping operations.

The system 500 of an eNB/gNB, for example, can perform a listen-before-talk (LBT) procedure on one or more channels where one or more IoT devices can be scheduled to transmit on. The eNB 500 can then reserve the one or more channels for the one or more IoT devices based on the LBT procedure. Then the eNB can send a trigger to the one or more IoT devices/UEs to notify the one or more the devices of when the one or more channels have been reserved successfully.

In one example, the eNB 500 can transmit a transmission duration via a preamble or a CPDCCH for the one or more channels when the LBT procedure is performed successfully. The transmission duration can be encoded via tail-biting convolutional code (TBCC) (e.g., at a 1/3 rate or the like) and a QPSK modulation. The preamble or CPDDCH can span over one or more OFDM symbols, including a CRS, a CSI-RS, or a DMRS, as well as one or more synchronization signals (e.g., PSS or SSS). One or more of these signals can be mapped or generated based on a default cell-ID (e.g., 0) or a default subframe index (e.g., 0).

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases.

Figure 6:
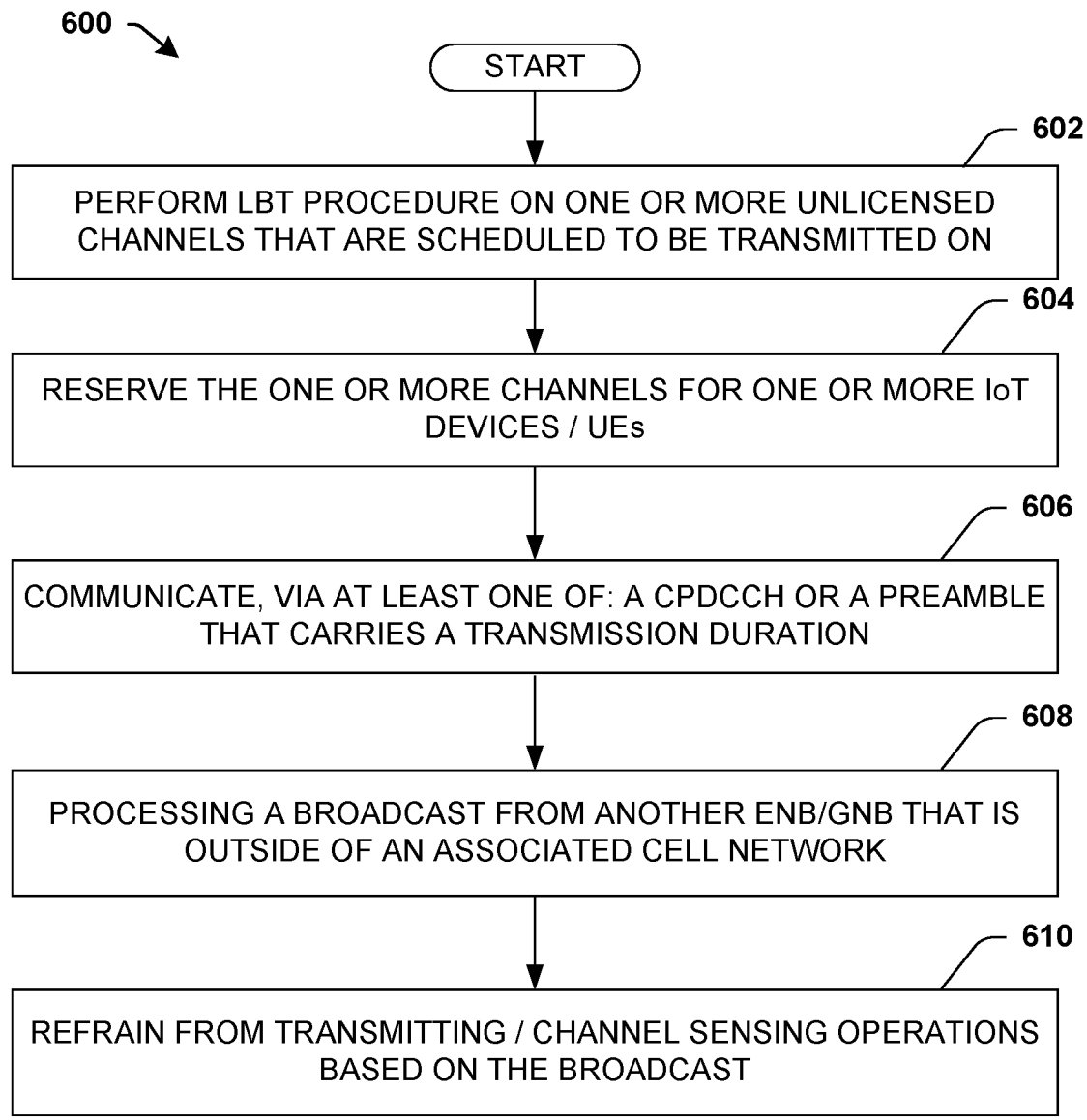
FIGS. 6-7 illustrate various process flows of processing or generating communications for unlicensed channels to utilize frequency hopping by IoT devices according to various aspects/embodiments described herein.

Referring to FIG. 6, illustrated is an example process flow 600 for an eNB/gNB, for example, to perform LBT for U-IoT supporting frequency hopping.

At 702, the process flow 600 comprises performing an LBT procedure on one or more unlicensed channels that are scheduled to be transmitted on. The eNB/gNB can schedule a set of unlicensed channels for one or more IoT devices to communicate on by frequency hopping. Then the eNB 500 can perform LBT for the channels where U-IoT UEs 400 are scheduled to transmit on.

At 704, the eNB/gNB 500 can reserve the channels for these U-IoT UEs 400.

At 706, a communication can be generated that comprises a CPDCCH or a preamble that carries a transmission duration, or an indication of a duration, which can also be configured as a trigger to one or more IoT devices with other information.

In an aspect, the eNB 500 can indicate the total length of the transmission (NAV) via the transmission of a preamble, or a CPDCCH. Regardless of the trigger mechanisms (e.g., by preamble or CPDCCH transmission), the eNB 500, for example, can transmit a reservation signal after the end of a successful LBT, and before the scheduled transmission. In response to the indication, the U-IoT 400 can then transmit without performing an LBT or performing a single-shot LBT (i.e. with no backoff) before transmission.

In response to the U-IoT 400 being scheduled to transmit on multiple channels according to a frequency hopping pattern, the U-IoT 400 can perform an LBT procedure/operation for all the channels that it is expected to transmit on, or on those channels that are scheduled by the eNB 500 as successful according to the trigger mechanism being transmitted/indicate in the preamble or CPDCCH. In this case, as a first embodiment, the U-IoT 400, for example, can perform LBT for scheduled channels before the first scheduled subframe. In another aspect, as a second embodiment, the U-IoT 400, for example, can perform LBT on each of scheduled channels right before the scheduled subframe for transmission on that particular channel.

In other aspects, the channel can be reserved by a U-IoT 400 and can be shared/reserved with one or more other U-IoTs. In this case, the eNB 500 can schedule multiple U-IoT 400s and enable each U-IoT 400 to perform an LBT procedure on one or multiple unlicensed channels that are scheduled for the same U-IoT 400 or another U-IoT 400 to transmit on. As long as the LBT succeeds and the channel is reserved by the eNB 500 or the U-IoT 400, another U-IoT 400 scheduled by the eNB 500 does not necessarily perform an LBT, or could just perform a single-shot LBT before transmission (i.e. no backoff), for example.

Any combination of the above mechanisms/aspects herein/embodiments herein can be utilized together, in addition or alternatively to one another. Embodiments herein can relate to the scenario where U-IoT performs LBT for co-existence with incumbent systems and other U-IoT networks. The mechanisms are disclosed to support performing LBT when frequency hopping on unlicensed bands by U-IoT devices, for example.

As such, the eNB 500 can perform LBT on all the channels that it schedules UL transmissions, and reserved the channel for the scheduled U-IoT 400s. To reserve the channel at 604, the eNB 500 can consider the following one or more aspects/embodiments independently or in combination.

For example, the eNB 500 can indicate the transmission duration as a network allocation vector (NAV) via a preamble, which can span over one or multiple symbols. The information on transmission duration can include the expected number of DL and UL subframes for transmission (e.g., as part of a transmission opportunity or TxOP). The duration can be the total duration of the burst, or a subset of subframes during which the received eNB 500s cannot transmit/perform LBT on those channels or for the duration.

In an aspect, the preamble can be broadcasted before the transmission of the burst. The receiver device (e.g., another eNB/gNB/IoT device) performs blind detection of the preamble. Upon reception of the preamble, a nearby receiver (e.g., eNB/gNB on the same cell network as the eNB/gNB 500 or a nearby/neighboring network) that successfully receives the preamble operates by refraining from any transmission/channel sensing during the burst duration indicated by the preamble.

In an embodiment, the burst duration information of the transmission can be encoded via tail-biting convolutional code (TBCC) (e.g., at about a 1/3 rate or the like) and Quadrature Phase Shift Keying (QPSK) modulation. The burst information (e.g., with the preamble or the CPDCCH transmission) can include or be modified with one or more of the following: Cell specific reference signals (CRS)/Channel state information reference signals (CSI-RS)/Demodulation Reference Signal (DMRS) signal can be modified, so that preamble is detectable by all nearby eNB 500s/IoT device accordingly such as by demodulation. The CRS/CSI-RS/DMRS generation and mapping can be based on a Cell-ID that can be modified based on a default ID (e.g. 0, or the like). The subframe index used for the RS generation can be the actual subframe index, or be set to a default value (e.g. 0, or the like).

In one or more aspects/embodiments, the CRS or other reference signals can be modified or changed. For example, CRS can use gold sequences whose generation is dependent on the Cell ID. In order to reduce the blind decoding attempts at the eNB 500, Cell-ID (NID) can be used for a cinit or an initial cell seed as set to a default value for CRS scrambling as this is specified in 36.211 6.3.1. In one embodiment, default Cell-ID used is 0.

The CRS mapping for the preamble can occur according to the default cell-ID. Scrambling of the channels can further be performed according to a following representative operation, as specified/defined in 3GPP TS 36.211 6.3.1:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for } PDSCH \\ \lfloor n_s/2 \rfloor \cdot 2^9 + N_{ID}^{MBSFN} & \text{for } PMCH \end{cases}.$$

PDCCH multiplexing and scrambling can be performed according to a following representative operation of 3GPP TS 36.211 6.8.2:

$$c_{init} = \lfloor n_s/2 \rfloor \cdot 2^9 + N_{ID}^{cell}.$$

The preamble/CPDCCH can also include a Primary Synchronization Signal (PSS), or a Secondary Synchronization Signal (SSS). Similar to the other reference signals (RSs), the generation of the PSS/SSS can be based on a default Cell-ID (e.g. 0) or a default subframe index (e.g., 0) as discussed above. The performance/blind detection of preamble detection can be improved with PSS/SSS.

For example, in one embodiment, the PSS can be present/generated in a first symbol (e.g., OFDM symbol) of the preamble in the middle/central 6RBs of the symbol. Alternatively, or additionally, in an aspect, the SSS can be present/generated in the second symbol of the preamble in the middle/central 6RBs. Alternatively, or additionally, the PSS/SSS can be located in the DRS symbols in LAA systems (e.g., PSS at symbol 6 and SSS at symbol 5).

In other aspects, alternatively, or additionally, the eNB 500 can indicate/generate the transmission duration (NAV) via a defined CPDCCH. For example, the duration can be the total duration of the burst, or a subset of subframes during which the received eNB 500s of other cells could be prohibited/refrain from transmitting/perform LBT on the corresponding unlicensed channels for the duration.

As such, at 608, the method 600 could also include processing a broadcast from another eNB or gNB that is outside of an associated cell network managed by the eNB/gNB 500. The broadcast can comprise a preamble/CPDCCH that carries a transmission duration as a network allocation vector (NAV) and an indication of which unlicensed channels of the plurality of unlicensed channels are reserved for frequency hopping operations.

At 610, in response to the broadcast, the eNB/gNB 500 can refrain from transmitting or channel sensing operations (e.g., based on the transmission duration, the NAV or other information in the broadcast).

The CPDCCH can be detectable o by the UEs/U-IoT 400s associated with the eNB 500 in the same network (or scheduled licensed channels), for example. These reference signals can be extended modified by the eNB/gNB 500 to be detectable by all nearby eNB 500s as well. For example, if the eNB 500s from the same operator receive the CPDCCH, the eNB 500 can perform blind detection of CPDCCH over NID and perform different hypothesis over scrambling for RS (e.g. CRS/CSI-RS/DMRS)/CPDCCH to demodulate the signal and determine the information transmitted. In other embodiments, the scrambling used for CPDCCH or the RSs can use a default Cell-ID value (e.g. 0).

In an aspect, the eNB 500 can continue transmitting reservation signals after successful LBT procedures before scheduling a transmission to hold the channel. In this mechanism/embodiment, after the eNB 500 successfully reserves the channel, U-IoT 400 can perform no LBT or single-shot LBT (i.e. no backoff) right before the transmission on scheduled channels.

To notify the U-IoT 400s if the eNB 500 has successfully reserved the channel, a trigger can be sent by eNB 500. In an aspect, the trigger can be sent via a CPDCCH. Alternatively, or additionally, the preamble/CPDCCH can be used to transmit NAV, which can be interpreted as the trigger to notify U-IoT 400s of the reservation, the particular reserved channels, or that frequency hopping is possible on certain or all unlicensed channels being scheduled for the one or more U-IoT 400s.

In an embodiment, if only a subset of the scheduled channels (e.g., less than all scheduled unlicensed channels) are indicated by eNB 500 to have successful LBT for a U-IoT 400, then U-IoT 400 can transmit only on the channels whose LBT has succeeded at the corresponding scheduled subframes, and skip the transmissions on the channels whose LBT has failed (e.g., via frequency hopping). Alternatively, or additionally, the U-IoT 400 can stop/halt transmission on any of the channels in response to one or more of the scheduled channels not having a successful LBT procedure (e.g., as a busy channel, or one determined not "idle" for use).

Figure 7:
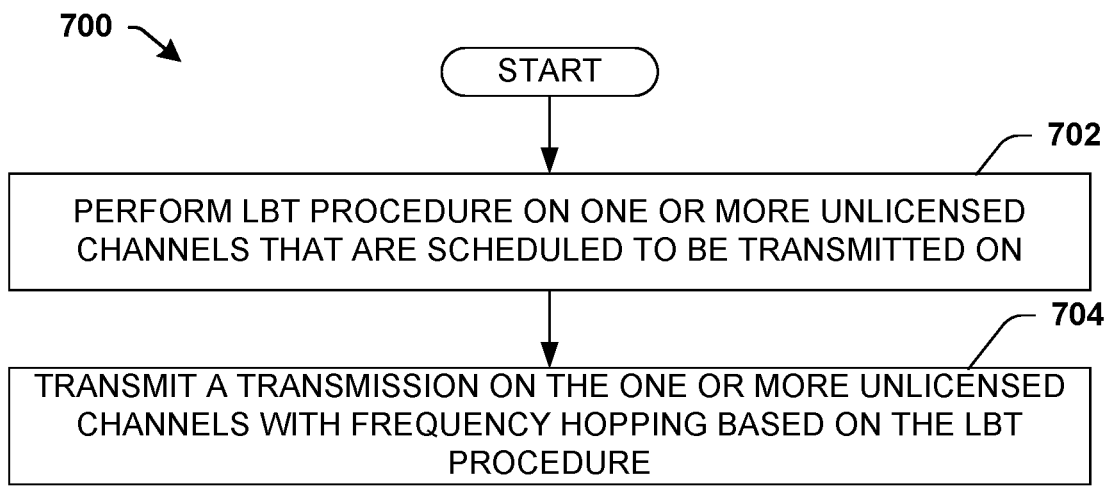

Referring now to FIG. 7, illustrated is a process flow 700 for a U-IoT 400, for example, to perform LBT for U-IoT supporting frequency hopping based on transmissions broadcasted by an eNB/gNB.

At 702, the process flow 700 comprises performing an LBT procedure on one or more unlicensed channels that are scheduled to be transmitted on for a transmission with a frequency hopping procedure.

At 704, a transmission can be transmitted on the one or more unlicensed channels based on the frequency hopping procedure.

In an aspect, U-IoT 400 performs LBT on all channels it is expected to transmit on, before the transmission. A U-IoT 400 can be scheduled to transmit on multiple channels in consecutive subframes according to a frequency hopping pattern. For example, the U-IoT 400 can transmit via frequency hopping on narrowband (NB) 1 in subframes 0-3, and transmits on NB 3 in subframes 4-7, where NB is a set of continuous Resource blocks (RBs). The U-IoT 400 can perform LBT for all the channels (e.g. NBs 1 and 3) that it is expected to transmit on.

The times for sensing the channel can be done according to one or more various embodiments. For example, the time to sense the channel can be before the start of the transmission (on any channel in the considered time duration), U-IoT 400 performs LBT on all channels it will transmit on in the following duration of T, where T can be the transmit opportunity (TxOP) duration defined by a regulation or standard, for example.

Alternatively, or additionally, for the channels where LBT succeeds before the transmission, but the U-IoT 400 does not start transmitting on these channels immediately, the U-IoT 400 can send a NAV to reserve these channels.

The U-IoT 400 could also generate a self-defer on the channels where it could not transmit immediately after the LBT, and perform no LBT or single-shot LBT right before the transmission on that channel. To perform single-shot LBT, a gap can exist for the transmission-receiving (Tx-Rx) and receiving-transmission (Rx-Tx) switching and the sensing duration within the schedule transmission opportunity or DL transmission burst from the eNB/gNB 500, for example.

If only a subset of the schedule unlicensed channels (e.g., less than all channels) is sensed to be "idle" (i.e. LBT succeeds), the following mechanisms can be considered for U-IoT 400 transmission: as a first alternative, If the LBT for at least one of the channels fails, the U-IoT 400 could not transmit on any of the scheduled channels; as a second alternative, the U-IoT 400 could transmit only on the channels whose LBT is successful.

In other aspects, right before the transmission on each channel (e.g., via frequency hopping, U-IoT 400 can perform LBT on that channel. In this case, some gap duration can exist for LBT between the transmissions on different channels (e.g., within a transmission burst, or TxOP with various scheduling grants). For example, if the U-IoT 400 senses a channel to be busy, the U-IoT 400 can continuously keep sensing this channel until the total scheduled duration for that U-IoT 400 ends; and if the U-IoT 400 is scheduled to transmit on another channel in following subframes, the U-IoT 400 will perform LBT on the other scheduled channel and transmit if LBT succeeds.

In another example, if the U-IoT 400 senses a channel to be busy, the U-IoT 400 can stop sensing the channel, and stop transmission even it is scheduled for another channels in the next few subframes, or perform LBT on the channel that the U-IoT 400 is scheduled to hop to in following subframes, if there are such scheduled channels in following subframes.

In other aspects, each scheduled U-IoT 400 can perform the LBT on one or more channels, while the reserved channels are shared among multiple scheduled U-IoT 400s, which can be identified by the broadcast transmission by the eNB/gNB 500, for example. When the channel reserved by a U-IoT 400 can be shared with another U-IoT 400s, the eNB 500 can schedule multiple U-IoT 400s and let each U-IoT 400 perform LBT on the one or more channels where the same U-IoT 400 or another U-IoT 400s can transmit on. When the LBT succeeds, the channel can be reserved by eNB 500 or the U-IoT 400 based on the mechanisms/aspects/embodiments discussed in herein with a preamble or a CPDCCH. Another U-IoT 400s can be scheduled by the eNB/gNB 500 that either does not necessarily need to perform an LBT or just perform single-shot LBT right before the scheduled transmission (i.e. no backoff).

The particular channels that each U-IoT 400 performs an LBT when scheduled can be indicated by eNB 500 in a UL grant, or semi-statically configured via higher layer signaling (e.g. RRC signaling). If only a subset of scheduled channels is sensed to be idle, the U-IoT 400 can transmit only on the channels whose LBT has succeeded at the corresponding scheduled subframes, and skip the transmissions on the channels whose LBT has failed. Alternatively, or additionally, the U-IoT 400 can stop transmission on any of the channels.

The above mechanisms (i.e. Mechanisms 1, 2, 3 and the embodiments in each mechanism) can be considered in an inclusive sense rather than in a restrictive sense. In other words, any combinations of the above mechanisms are possible.

In a first set of examples to the various aspects/embodiments herein, the below examples are envisioned further.

Example 1 can include an apparatus for an Evolved Node B (eNB), the apparatus comprising: means for performing a listen-before-talk (LBT) procedure on one or more channels where one or more user equipments (UEs) (e.g., U-IoT UE 400, or the like) are scheduled to transmit on; and means for reserving the one or more channels for the one or more UEs.

Example 2 can include the apparatus of example 1 or some other example herein, further comprising: means for sending a trigger to the one or more UEs to notify the one or more UEs when the means for reserving the one or more channels has performed successfully.

Example 3 can include the apparatus of example 1 or some other example herein, further comprising: means for indicating a transmission duration via a preamble for the one or more channels when the LBT procedure is performed successfully.

Example 4 can include the apparatus of example 3 or some other example herein, wherein the transmission duration is encoded via tail-biting convolutional code (TBCC) and QPSK modulation.

Example 5 can include the apparatus of example 3 or some other example herein, wherein the preamble spans over one or more orthogonal frequency division multiplex (OFDM) symbols.

Example 6 can include the apparatus of example 3 or some other example herein, wherein the preamble includes a cell specific reference signal (CRS), a channel state information reference signal (CSI-RS), or a demodulation reference signal (DMRS).

Example 7 can include the apparatus of any of the examples 1-6 or some other example herein, wherein the apparatus is a base station, or a portion thereof.

Example 8 can include an apparatus for a user equipment (UE), the apparatus comprising: means for performing a listen-before-talk (LBT) procedure on one or more channels where the UE is scheduled to transmit on; and means for transmitting on the one or more channels to an Evolved Node B (eNB).

Example 9 can include the apparatus of example 8 or some other example herein, wherein the means for transmitting on the one or more channels transmit in consecutive subframes according to a frequency hopping pattern.

Example 10 can include the apparatus of example 8 or some other example herein, further comprising: means for sending to the eNB a transmission duration to reserve the one or more channels.

Example 11 can include the apparatus of example 10 or some other example herein, wherein the transmission duration is encoded via tail-biting convolutional code (TBCC) and QPSK modulation.

Example 12 can include the apparatus of any of the examples 8-11 or some other example herein, wherein the apparatus is the UE, or a portion thereof.

Example 13 can include an apparatus for an Evolved Node B (eNB), the apparatus comprising: a first circuitry to perform a listen-before-talk (LBT) procedure on one or more channels where one or more user equipments (UEs) are scheduled to transmit on; and a second circuitry coupled with the first circuitry, the second circuitry to reserve the one or more channels for the one or more UEs.

Example 14 can include the apparatus of example 13 or some other example herein, further comprising: a third circuitry coupled with the second circuitry, the third circuitry to send a trigger to the one or more UEs to notify the one or more UEs when the means for reserving the one or more channels has performed successfully.

Example 15 can include the apparatus of example 13 or some other example herein, further comprising: a fourth circuitry coupled with the third circuitry, the fourth circuitry to indicate a transmission duration via a preamble for the one or more channels when the LBT procedure is performed successfully.

Example 16 can include the apparatus of example 15 or some other example herein, wherein the transmission duration is encoded via tail-biting convolutional code (TBCC) and QPSK modulation.

Example 17 can include the apparatus of example 15 or some other example herein, wherein the preamble spans over one or more orthogonal frequency division multiplex (OFDM) symbols.

Example 18 can include the apparatus of example 15 or some other example herein, wherein the preamble includes a cell specific reference signal (CRS), a channel state information reference signal (CSI-RS), or a demodulation reference signal (DMRS).

Example 19 can include the apparatus of any of the examples 13-18 or some other example herein, wherein the apparatus is a base station, or a portion thereof.

Example 20 can include an apparatus for a user equipment (UE), the apparatus comprising: a first circuitry to perform a listen-before-talk (LBT) procedure on one or more channels where the UE is scheduled to transmit on; and a second circuitry coupled with the first circuitry, the second circuitry to transmit on the one or more channels to an Evolved Node B (eNB).

Example 21 can include the apparatus of example 20 or some other example herein, wherein the means for transmitting on the one or more channels transmit in consecutive subframes according to a frequency hopping pattern.

Example 22 can include the apparatus of example 20 or some other example herein, further comprising: a third circuitry coupled with the second circuitry, the third circuitry to send to the eNB a transmission duration to reserve the one or more channels.

Example 23 can include the apparatus of example 22 or some other example herein, wherein the transmission duration is encoded via tail-biting convolutional code (TBCC) and QPSK modulation.

Example 24 can include the apparatus of any of the examples 20-23 or some other example herein, wherein the apparatus is the UE, or a portion thereof.\

Example 25 can include a method for an Evolved Node B (eNB), the method comprising: performing a listen-before-talk (LBT) procedure on one or more channels where one or more user equipments (UEs) are scheduled to transmit on; and reserving the one or more channels for the one or more UEs.

Example 26 can include the method of example 25 or some other example herein, further comprising: sending a trigger to the one or more UEs to notify the one or more UEs when the means for reserving the one or more channels has performed successfully.

Example 27 can include the method of example 25 or some other example herein, further comprising: indicating a transmission duration via a preamble for the one or more channels when the LBT procedure is performed successfully.

Example 28 can include the method of example 27 or some other example herein, wherein the transmission duration is encoded via tail-biting convolutional code (TBCC) and QPSK modulation.

Example 29 can include the method of example 27 or some other example herein, wherein the preamble spans over one or more orthogonal frequency division multiplex (OFDM) symbols.

Example 30 can include the method of example 27 or some other example herein, wherein the preamble includes a cell specific reference signal (CRS), a channel state information reference signal (CSI-RS), or a demodulation reference signal (DMRS).

Example 31 can include the method of any of the examples 25-30 or some other example herein, wherein the method is performed by a base station, or a portion thereof.

Example 32 can include a method for a user equipment (UE), the apparatus comprising: performing a listen-before-talk (LBT) procedure on one or more channels where the UE is scheduled to transmit on; and transmitting on the one or more channels to an Evolved Node B (eNB).

Example 33 can include the method of example 32 or some other example herein, wherein the means for transmitting on the one or more channels transmit in consecutive subframes according to a frequency hopping pattern.

Example 34 can include the method of example 32 or some other example herein, further comprising: sending to the eNB a transmission duration to reserve the one or more channels.

Example 35 can include the method of example 34 or some other example herein, wherein the transmission duration is encoded via tail-biting convolutional code (TBCC) and QPSK modulation.

Example 36 can include the method of any of the examples 32-35 or some other example herein, wherein the method is performed by the UE, or a portion thereof.

Example 37 can include a method of LBT for unlicensed-IoT (U-IoT) supporting frequency hopping.

Example 38 can include the method of example 37 or some other example herein, wherein eNB performs LBT on all channels that are scheduled for DL/UL transmissions, and reserves the channels for scheduled UEs.

Example 39 can include the method of example 38 or some other example herein, wherein to reserve the channels whose LBT succeeds, eNB can indicate the transmission duration (NAV) via preamble.

Example 40 can include the method of example 39 or some other example herein, wherein burst duration information can be encoded via TBCC at 1/3 rate and QPSK modulation.

Example 41 can include the method of example 39 or some other example herein, wherein the preamble can span over one or multiple OFDM symbols, and can include CRS/CSI-RS/DMRS/PSS/SSS.

Example 42 can include the method of example 41 or some other example herein, wherein the generation/RE mapping of RSs (CRS/CSI-RS/DMRS) and synchronization signals (PSS/SSS) be based on a default Cell-ID (e.g. 0) or a default subframe index (e.g. 0).

Example 43 can include the method of example 41 or some other example herein, wherein PSS can be present in first symbol of preamble in the middle 6RBs.

Example 44 can include the method of example 41 or some other example herein, wherein SSS can be present in second symbol of preamble in the middle 6RBs.

Example 45 can include the method of example 41 or some other example herein, wherein PSS/SSS can be located in the symbols same as DRS in LAA systems (PSS at symbol 6 and SSS at symbol 5).

Example 46 can include the method of example 38 or some other example herein, wherein to reserve the channels whose LBT succeeds, eNB can indicate the transmission duration (NAV) via a newly defined CPDCCH.

Example 47 can include the method of example 46 or some other example herein, wherein legacy CPDCCH can be extended to be decodable by all nearby eNBs.

Example 48 can include the method of example 46 or some other example herein, wherein eNB can perform blind detection of CPDCCH over NID and different hypothesis over scrambling for RS (e.g. CRS/CSI-RS/DMRS)/CPDCCH.

Example 49 can include the method of example 46 or some other example herein, wherein the scrambling used for CPDCCH or RSs can be based on a default Cell-ID value, e.g. 0.

Example 50 can include the method of examples 39 and 46 or some other example herein, wherein the transmission duration (NAV) indication is transmitted before the start of the burst, and the receiver performs blind detection.

Example 51 can include the method of examples 39 and 46 or some other example herein, wherein the receiver that successfully receives the preamble refrains from any transmissions/channel sensing during the indicated burst duration.

Example 52 can include the method of examples 39 and 46 or some other example herein, wherein the information on transmission duration can be in terms of expected number of DL and UL subframes. The duration can be the total duration of the burst, or a subset of subframes during which the received eNBs should not transmit/perform LBT.

Example 53 can include the method of example 38 or some other example herein, wherein to reserve the channels whose LBT succeeds, eNB can transmit a reservation signals after the successful LBT before scheduled transmissions to hold the channel.

Example 54 can include the method of example 38 or some other example herein, wherein after the eNB successfully reserved the channel, UE can perform no LBT or single-shot LBT (i.e. no backoff) right before the transmission on scheduled channels.

Example 55 can include the method of example 38 or some other example herein, wherein to notify the UEs if the eNB has successfully reserved the channel, a trigger can be sent by eNB.

Example 56 can include the method of example 55 or some other example herein, wherein the trigger can be sent via a CPDCCH.

Example 57 can include the method of example 55 or some other example herein, wherein the preamble/CPDCCH used to transmit NAV can be interpreted as the trigger to notify UEs.

Example 58 can include the method of example 38 or some other example herein, wherein if only a subset of scheduled channels is indicated by eNB to have successful LBT for a UE, the UE can: transmit only on the channels whose LBT has succeeded at the corresponding scheduled subframes, and skip the transmissions on the channels whose LBT has failed; or stop transmission on any of the channels.

Example 59 can include the method of example 37 or some other example herein, wherein UE performs LBT before the transmission on all channels it is expected to transmit on.

Example 60 can include the method of example 59 or some other example herein, wherein before the start of first scheduled subframe, UE can perform LBT on all channels it will transmit during following duration of T, e.g. T can be the TxOP duration defined by the regulation.

Example 61 can include the method of example 60 or some other example herein, wherein for channels where LBT succeeds before the transmission, but the UE does not start transmitting on these channels immediately, UE can send NAV to reserve these channels.

Example 62 can include the method of example 60 or some other example herein, wherein for channels where LBT succeeds before the transmission, but the UE does not start transmitting on these channels immediately, UE can self-defer after the LBT, and perform no LBT or single-shot LBT right before the transmission on that channel.

Example 63 can include the method of example 62 or some other example herein, wherein to perform single-shot LBT, a gap can exist for the Tx-Rx and Rx-Tx switching and the sensing duration.

Example 64 can include the method of example 60 or some other example herein, wherein if only a subset of the channels is sensed to be "idle" (i.e. LBT succeeds), the following methods can be considered for UE transmission: alternative 1: If the LBT for at least one of the channels fails, the UE will not transmit on any of the channels; or alternative 2: The UE will transmit on the channels whose LBT is successful.

Example 65 can include the method of example 59 or some other example herein, wherein UE can perform LBT on the scheduled channel right before the schedule time to transmit on that channel.

Example 66 can include the method of example 65 or some other example herein, wherein some gap duration can exist for LBT between the transmissions on different channels.

Example 67 can include the method of example 65 or some other example herein, wherein if the UE senses a channel to be busy, the UE can continuously keep sensing this channel until the total scheduled duration for that UE ends, or the scheduled duration for that UE on the sensed channel ends.

Example 68 can include the method of example 65 or some other example herein, wherein UE can stop sensing the channel, and stop transmission even it is scheduled for another channels in next few subframes, or start performing LBT on the channel that the UE is scheduled to hop to before corresponding scheduled subframes.

Example 69 can include the method of example 37 or some other example herein, wherein each scheduled UE performs LBT on one or multiple channels and the reserved channels are shared among these scheduled UEs.

Example 70 can include the method of example 69 or some other example herein, wherein the channel whose LBT has succeeded can be reserved by eNB or the UE via preamble or CPDCCH.

Example 71 can include the method of example 69 or some other example herein, wherein other UEs scheduled by the eNB does not perform LBT or just perform single-shot LBT right before the scheduled transmission (i.e. no back-off).

Example 72 can include the method of example 69 or some other example herein, wherein Which channels each UE can perform LBT when scheduled can be indicated by eNB in the UL grant, or semi-statically configured via higher layer signaling (e.g. RRC signaling).

Example 73 can include the method of example 69 or some other example herein, wherein if only a subset of scheduled channels is sensed to be idle, the UE can: transmit only on the channels whose LBT has succeeded at the corresponding scheduled subframes, and skip the transmissions on the channels whose LBT has failed; or stop transmission on any of the channels.

Example 74 can include an apparatus comprising means to perform one or more elements of a method described in or related to any of examples 1-73, or any other method or process described herein.

Example 75 can include one or more non-transitory computer-readable media comprising instructions to cause an electronic device, upon execution of the instructions by one or more processors of the electronic device, to perform one or more elements of a method described in or related to any of examples 1-73, or any other method or process described herein.

Example 76 can include an apparatus comprising logic, modules, or circuitry to perform one or more elements of a method described in or related to any of examples 1-73, or any other method or process described herein.

Example 77 can include a method, technique, or process as described in or related to any of examples 1-73, or portions or parts thereof.

Example 78 can include an apparatus comprising: one or more processors and one or more computer readable media comprising instructions that, when executed by the one or more processors, cause the one or more processors to perform the method, techniques, or process as described in or related to any of examples 1-73, or portions thereof.

Example 79 can include a method of communicating in a wireless network as shown and described herein.

Example 80 can include a system for providing wireless communication as shown and described herein.

Example 81 can include a device for providing wireless communication as shown and described herein.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

In a second set of examples to the various aspects/embodiments herein, the below examples are envisioned further.

Example 1 is a computer-readable storage medium storing executable instructions that, in response to execution, cause one or more processors of an evolved NodeB (eNB) or a next generation NodeB (gNB) to perform operations, comprising: performing a listen before talk (LBT) operation on a plurality of unlicensed channels scheduled to an unlicensed internet of things (U-IoT) device to enable a frequency hopping operation for uplink (UL)/downlink (DL) transmissions; and reserving the plurality of unlicensed channels for the U-IoT device to perform the frequency hopping operation based on the LBT operation.

Example 2 includes the subject matter of Example 1, wherein the operations further comprise: communicating, via at least one of: a conventional/common physical downlink control channel (CPDCCH) or a preamble that carries a transmission duration as a network allocation vector (NAV), a DL communication that indicates to the U-IoT device whether the plurality of unlicensed channels is reserved for the frequency hopping operation.

Example 3 includes the subject matter of any one of Examples 1-2, including or omitting any elements as optional, wherein the operations further comprise: generating a trigger in a DL communication that indicates which of the plurality of unlicensed channels are successfully reserved for the frequency hopping operation.

Example 4 includes the subject matter of any one of Examples 1-3, including or omitting any elements as optional, wherein the operations further comprise: generating a preamble, or a CPDCCH, in a DL communication that carries a transmission duration as a network allocation vector (NAV) and further indicates which unlicensed channels of the plurality of unlicensed channels are reserved for the frequency hopping operation.

Example 5 includes the subject matter of any one of Examples 1-4, including or omitting any elements as optional, wherein the preamble, or the CPDCCH, comprises one or more orthogonal frequency division multiplex (OFDM) symbols of the DL communication and includes at least one of: an indication of an expected number of DL and uplink (UL) subframes, a duration spanning the DL communication, or another duration spanning a subset of the DL communication.

Example 6 includes the subject matter of any one of Examples 1-5, including or omitting any elements as optional, wherein the operations further comprise: broadcasting the preamble before transmitting the DL communication to trigger a receiving device to refrain from a transmission or a channel sensing operation based on the at least one of the indication, the duration or the another duration.

Example 7 includes the subject matter of any one of Examples 1-6, including or omitting any elements as optional, wherein the at least one: of the indication, the duration or the another duration is encoded via a tail-biting convolutional code (TBCC) and quadrature phase shift keying (QPSK) modulation.

Example 8 includes the subject matter of any one of Examples 1-7, including or omitting any elements as optional, wherein the preamble includes at least one of: a cell specific reference signal (CRS), a channel state information reference signal (CSI-RS), or a demodulation reference signal (DMRS).

Example 9 includes the subject matter of any one of Examples 1-8, including or omitting any elements as optional, wherein the generating further comprising resource element (RE) mapping of one or more reference signals RSs including at least one of: a CRS, a CSI-RS, or a DMRS, and one or more synchronization signals based on a default Cell-ID or a default subframe index.

Example 10 includes the subject matter of any one of Examples 1-9, including or omitting any elements as optional, wherein the one or more synchronization signals comprises a primary synchronization signal (PSS) in a first symbol of the preamble in a middle six resource blocks (RBs), and a secondary synchronization signal (SSS) in a second symbol of the preamble in another middle six RBs.

Example 11 includes the subject matter of any one of Examples 1-10, including or omitting any elements as optional, wherein the operations further comprise: generating a CRS/CSI-RS/DMRS in a preamble of a DL communication to be detectable by other eNBs or gNBs outside of an associated cell network based on a default cell ID or a default subframe index that is different from an actual subframe index.

Example 12 includes the subject matter of any one of Examples 1-11, including or omitting any elements as optional, wherein the operations further comprise: processing a broadcast from another eNB or gNB that is outside of an associated cell network, wherein the broadcast comprises a preamble that carries a transmission duration as a network allocation vector (NAV) and an indication of which unlicensed channels of the plurality of unlicensed channels are reserved for frequency hopping operations; and refraining from transmitting or channel sensing operations based on the transmission duration.

Example 13 is a computer-readable storage medium storing executable instructions that, in response to execution, cause one or more processors of an Internet of Things (IoT) device to perform operations, comprising: performing a listen before talk (LBT) procedure on a plurality of unlicensed channels scheduled to enable a frequency hopping procedure for a transmission; and transmitting on the plurality of unlicensed channels based on the frequency hopping procedure.

Example 14 includes the subject matter of Example 13, wherein the performing the LBT procedure is based on a trigger in a downlink (DL) communication that indicates a duration of the transmission and the plurality of unlicensed channels to perform the frequency hopping procedure on the plurality of unlicensed channels for the transmission.

Example 15 includes the subject matter of any one of Examples 13-14, including or omitting any elements as optional, wherein the operations further comprise: in response to the LBT procedure being successful on less than all of the plurality of unlicensed channels, refraining from transmitting on any of the plurality of unlicensed channels, or transmitting on only one or more successful unlicensed channels of the plurality of unlicensed channels.

Example 16 includes the subject matter of any one of Examples 13-15, including or omitting any elements as optional, wherein the operations further comprise: deferring the transmission on an unlicensed channel of the plurality of channels in response to the LBT procedure, and transmitting on the unlicensed channel without another LBT procedure before the transmission, or by performing a single-shot LBT procedure within a gap of a transmission opportunity duration.

Example 17 includes the subject matter of any one of Examples 13-16, including or omitting any elements as optional, wherein the performing the LBT procedure on the plurality of unlicensed channels comprises performing the LBT procedure on the plurality of unlicensed channels before a first subframe of the transmission according to a frequency hopping pattern on the plurality of unlicensed channels.

Example 18 includes the subject matter of any one of Examples 13-17, including or omitting any elements as optional, wherein the performing the LBT procedure on the plurality of unlicensed channels comprises performing the LBT procedure immediately before transmitting a scheduled subframe on an unlicensed channel of the plurality of unlicensed channels being utilized in the frequency hopping procedure.

Example 19 includes the subject matter of any one of Examples 13-18, including or omitting any elements as optional, wherein the operations further comprise: reserving the plurality of unlicensed channels to enable the transmission based on the frequency hopping procedure and other transmissions by another IoT device or a user equipment (UE) within a corresponding network by transmitting; and sharing the plurality of unlicensed channels with the another IoT device or the UE.

Example 20 is an apparatus configured to be employed in an evolved NodeB (eNB) or a next generation NodeB (gNB) comprising: one or more processors configured to: perform a listen before talk (LBT) operation on one or more unlicensed channels scheduled to an unlicensed internet of things (U-IoT) device to enable a frequency hopping operation for uplink (UL)/downlink (DL) transmissions; and reserve the one or more unlicensed channels for the U-IoT device to perform the frequency hopping operation based on the LBT operation; a radio frequency (RF) interface, configured to send, to RF circuitry, data for a DL transmission that schedules the one or more unlicensed channels for transmission by the U-IoT device.

Example 21 includes the subject matter of Example 20, including or omitting any elements as optional, wherein the one or more processors are further configured to: communicate a conventional/common physical downlink control channel (CPDCCH) or a preamble of the DL transmission that carries a transmission duration as a network allocation vector (NAV) to trigger or notify the one or more unlicensed internet of things (U-IoT) devices of the one or more unlicensed channels successfully reserved for the frequency hopping operation.

Example 22 includes the subject matter of any one of Examples 20-21, including or omitting any elements as optional, wherein the preamble, or the CPDCCH, comprises one or more orthogonal frequency division multiplex (OFDM) symbols of the DL transmission, including at least one of: an indication of a number of DL and uplink (UL) subframes, or a duration spanning the DL transmission or a subset of the DL transmission, to provide notice to the U-IoT device for an associated transmission or to other eNBs/gNBs neighboring an associated cell network to refrain from transmitting or channel sensing based on the indication or the duration.

Example 23 includes the subject matter of any one of Examples 20-22, including or omitting any elements as optional, wherein the one or more processors are further configured to: map one or more resource elements (REs) of one or more reference signals RSs including at least one of: a cell specific reference signal (CRS), a channel state information reference signal (CSI-RS), or a demodulation reference signal (DMRS), and one or more synchronization signals in the preamble or the CPDCCH based on a default Cell-ID or a default subframe index.

Example 24 includes the subject matter of any one of Examples 20-23, including or omitting any elements as optional, wherein the one or more processors are further configured to: process a broadcast from another eNB or gNB that is outside of an associated cell network, wherein the broadcast comprises a preamble that carries a transmission duration as a network allocation vector (NAV) and an indication of which unlicensed channels of the one or more unlicensed channels are reserved for frequency hopping operations; and refrain from transmitting or channel sensing operations based on the transmission duration.

Example 25 includes the subject matter of any one of Examples 20-24, including or omitting any elements as optional, wherein the one or more processors are further configured to: schedule one or more IoT devices, one or more user equipments (UEs), or both the one or more IoT devices and one or more UEs, to share the one or more unlicensed channels via the preamble or the CPDCCH.

Example 26 is an apparatus configured to be employed in an Internet of Things (IoT) device comprising: one or more processors configured to: perform a listen before talk (LBT) procedure on a plurality of unlicensed channels scheduled to enable a frequency hopping procedure for a transmission based on a downlink (DL) transmission; and a radio frequency (RF) interface, configured to send, to RF circuitry, data for the transmission on the plurality of unlicensed channels via the frequency hopping procedure based on the LBT procedure.

Example 27 includes the subject matter of Example 26, wherein the LBT procedure is based on a trigger in the downlink (DL) communication, wherein the trigger indicates a duration of the transmission and the plurality of unlicensed channels to perform the frequency hopping procedure on the plurality of unlicensed channels for the transmission.

Example 28 includes the subject matter of any one of Examples 26-27, including or omitting any elements as optional, wherein the one or more processors are further configured to: in response to the LBT procedure being successful on less than all of the plurality of unlicensed channels, refrain from transmitting on any of the plurality of unlicensed channels, or transmitting on only one or more successful unlicensed channels of the plurality of unlicensed channels.

Example 29 includes the subject matter of any one of Examples 26-28, including or omitting any elements as optional, wherein the one or more processors are further configured to: defer the transmission on an unlicensed channel of the plurality of channels in response to the LBT procedure, and transmitting on the unlicensed channel without another LBT procedure before the transmission, or by performing a single-shot LBT procedure within a gap of a transmission opportunity duration.

Example 30 includes the subject matter of any one of Examples 26-29, including or omitting any elements as optional, wherein the LBT procedure on the plurality of unlicensed channels comprises performing the LBT procedure on the plurality of unlicensed channels before a first subframe of the transmission according to a frequency hopping pattern on the plurality of unlicensed channels.

Example 31 includes the subject matter of any one of Examples 26-30, including or omitting any elements as optional, wherein the LBT procedure on the plurality of unlicensed channels comprises performing the LBT procedure immediately before transmitting a scheduled subframe on an unlicensed channel of the plurality of unlicensed channels being utilized in the frequency hopping procedure.

Example 32 includes the subject matter of any one of Examples 26-31, including or omitting any elements as optional, wherein the one or more processors are further configured to: reserve the plurality of unlicensed channels to enable the transmission based on the frequency hopping procedure and other transmissions by another IoT device or a user equipment (UE) within a corresponding network by transmitting; and share the plurality of unlicensed channels with the another IoT device or the UE.

Example 33 is an apparatus of an evolved NodeB (eNB) or a next generation NodeB (gNB) comprising: means for performing a listen before talk (LBT) operation on a plurality of unlicensed channels scheduled to an unlicensed internet of things (U-IoT) device to enable a frequency hopping operation for uplink (UL)/downlink (DL) transmissions; and means for reserving the plurality of unlicensed channels for the U-IoT device to perform the frequency hopping operation based on the LBT operation.

Example 34 includes the subject matter of Example 33, further comprising: means for communicating, via at least one of: a conventional/common physical downlink control channel (CPDCCH) or a preamble that carries a transmission duration as a network allocation vector (NAV), a DL communication that indicates to the U-IoT device whether the plurality of unlicensed channels is reserved for the frequency hopping operation.

Example 35 includes the subject matter of any one of Examples 33-34, including or omitting any elements as optional, further comprising: means for generating a trigger in a DL communication that indicates which of the plurality of unlicensed channels are successfully reserved for the frequency hopping operation.

Example 36 includes the subject matter of any one of Examples 33-35, including or omitting any elements as optional, further comprising: means for generating a preamble, or a CPDCCH, in a DL communication that carries a transmission duration as a network allocation vector (NAV) and further indicates which unlicensed channels of the plurality of unlicensed channels are reserved for the frequency hopping operation.

Example 37 includes the subject matter of any one of Examples 33-36, including or omitting any elements as optional, wherein the preamble, or the CPDCCH, comprises one or more orthogonal frequency division multiplex (OFDM) symbols of the DL communication and includes at least one of: an indication of an expected number of DL and uplink (UL) subframes, a duration spanning the DL communication, or another duration spanning a subset of the DL communication.

Example 38 includes the subject matter of any one of Examples 33-36, including or omitting any elements as optional, further comprising: means for broadcasting the preamble before transmitting the DL communication to trigger a receiving device to refrain from a transmission or a channel sensing operation based on the at least one of the indication, the duration or the another duration.

Example 39 includes the subject matter of any one of Examples 33-37, including or omitting any elements as optional, wherein the at least one: of the indication, the duration or the another duration is encoded via a tail-biting convolutional code (TBCC) and quadrature phase shift keying (QPSK) modulation.

Example 40 includes the subject matter of any one of Examples 33-39, including or omitting any elements as optional, wherein the preamble includes at least one of: a cell specific reference signal (CRS), a channel state information reference signal (CSI-RS), or a demodulation reference signal (DMRS).

Example 41 includes the subject matter of any one of Examples 33-40, including or omitting any elements as optional, wherein the generating further comprising resource element (RE) mapping of one or more reference signals RSs including at least one of: a CRS, a CSI-RS, or a DMRS, and one or more synchronization signals based on a default Cell-ID or a default subframe index.

Example 42 includes the subject matter of any one of Examples 33-41, including or omitting any elements as optional, wherein the one or more synchronization signals comprises a primary synchronization signal (PSS) in a first symbol of the preamble in a middle six resource blocks (RBs), and a secondary synchronization signal (SSS) in a second symbol of the preamble in another middle six RBs.

Example 43 includes the subject matter of any one of Examples 33-42, including or omitting any elements as optional, further comprising: means for generating a CRS/CSI-RS/DMRS in a preamble of a DL communication to be detectable by other eNBs or gNBs outside of an associated cell network based on a default cell ID or a default subframe index that is different from an actual subframe index.

Example 44 includes the subject matter of any one of Examples 33-43, including or omitting any elements as optional, further comprising: means for processing a broadcast from another eNB or gNB that is outside of an associated cell network, wherein the broadcast comprises a preamble that carries a transmission duration as a network allocation vector (NAV) and an indication of which unlicensed channels of the plurality of unlicensed channels are reserved for frequency hopping operations; and means for refraining from transmitting or channel sensing operations based on the transmission duration.

Example 45 is an apparatus of an Internet of Things (IoT) device, comprising: means for performing a listen before talk (LBT) procedure on a plurality of unlicensed channels scheduled to enable a frequency hopping procedure for a transmission; and means for transmitting on the plurality of unlicensed channels based on the frequency hopping procedure.

Example 46 includes the subject matter of Example 46, wherein the performing the LBT procedure is based on a trigger in a downlink (DL) communication that indicates a duration of the transmission and the plurality of unlicensed channels to perform the frequency hopping procedure on the plurality of unlicensed channels for the transmission.

Example 47 includes the subject matter of any one of Examples 45-46, including or omitting any elements as optional, further comprising: in response to the LBT procedure being successful on less than all of the plurality of unlicensed channels, means for refraining from transmitting on any of the plurality of unlicensed channels, or transmitting on only one or more successful unlicensed channels of the plurality of unlicensed channels.

Example 48 includes the subject matter of any one of Examples 45-47, including or omitting any elements as optional, further comprising: means for deferring the transmission on an unlicensed channel of the plurality of channels in response to the LBT procedure, and transmitting on the unlicensed channel without another LBT procedure before the transmission, or by performing a single-shot LBT procedure within a gap of a transmission opportunity duration.

Example 49 includes the subject matter of any one of Examples 45-48, including or omitting any elements as optional, wherein the means for performing the LBT procedure on the plurality of unlicensed channels comprises means for performing the LBT procedure on the plurality of unlicensed channels before a first subframe of the transmission according to a frequency hopping pattern on the plurality of unlicensed channels.

Example 50 includes the subject matter of any one of Examples 45-49, including or omitting any elements as optional, wherein the means for performing the LBT procedure on the plurality of unlicensed channels comprises means for performing the LBT procedure immediately before transmitting a scheduled subframe on an unlicensed channel of the plurality of unlicensed channels being utilized in the frequency hopping procedure.

Example 51 includes the subject matter of any one of Examples 45-50, including or omitting any elements as optional, further comprising: means for reserving the plurality of unlicensed channels to enable the transmission based on the frequency hopping procedure and other transmissions by another IoT device or a user equipment (UE) within a corresponding network by transmitting; and means for sharing the plurality of unlicensed channels with the another IoT device or the UE.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A non-transitory computer-readable storage medium storing executable instructions that, in response to execution, cause one or more processors of an evolved NodeB (eNB) or a next generation NodeB (gNB) to perform operations, comprising:
performing a listen before talk (LBT) operation on a plurality of unlicensed channels scheduled to an unlicensed internet of things (U-IoT) device to enable a frequency hopping operation for uplink (UL)/downlink (DL) transmissions;
reserving the plurality of unlicensed channels for the U-IoT device to perform the frequency hopping operation based on the LBT operation; and
generating a preamble, or a CPDCCH, in a DL communication that carries a transmission duration as a network allocation vector (NAV) and further indicates which unlicensed channels of the plurality of unlicensed channels are reserved for the frequency hopping operation, wherein the preamble, or the CPDCCH, comprises one or more orthogonal frequency division multiplex (OFDM) symbols of the DL communication and includes at least one of: an indication of an expected number of DL and uplink (UL) subframes, a duration spanning the DL communication, or another duration spanning a subset of the DL communication.

2. The non-transitory computer-readable storage medium of claim 1, wherein the operations further comprise:
communicating, via at least one of: a conventional/common physical downlink control channel (CPDCCH) or a preamble that carries a transmission duration as a network allocation vector (NAV), a DL communication that indicates to the U-IoT device whether the plurality of unlicensed channels is reserved for the frequency hopping operation.

3. The non-transitory computer-readable storage medium of claim 1, wherein the operations further comprise:
generating a trigger in a DL communication that indicates which of the plurality of unlicensed channels are successfully reserved for the frequency hopping operation.

4. The non-transitory computer-readable storage medium of claim 1, wherein the operations further comprise:
broadcasting the preamble before transmitting the DL communication to trigger a receiving device to refrain from a transmission or a channel sensing operation based on the at least one of the indication, the duration or the another duration.

5. The non-transitory computer-readable storage medium of claim 1, wherein the at least one: of the indication, the duration or the another duration is encoded via a tail-biting convolutional code (TBCC) and quadrature phase shift keying (QPSK) modulation.

6. The non-transitory computer-readable storage medium of claim 1, wherein the preamble includes at least one of: a cell specific reference signal (CRS), a channel state information reference signal (CSI-RS), or a demodulation reference signal (DMRS).

7. The non-transitory computer-readable storage medium of claim 1, wherein the generating further comprising resource element (RE) mapping of one or more reference signals RSs including at least one of: a CRS, a CSI-RS, or a DMRS, and one or more synchronization signals based on a default Cell-ID or a default subframe index.

8. The non-transitory computer-readable storage medium of claim 7, wherein the one or more synchronization signals comprises a primary synchronization signal (PSS) in a first symbol of the preamble in a middle six resource blocks (RBs), and a secondary synchronization signal (SSS) in a second symbol of the preamble in another middle six RBs.

9. The non-transitory computer-readable storage medium of claim 1, wherein the operations further comprise:
generating a CRS/CSI-RS/DMRS in a preamble of a DL communication to be detectable by other eNBs or gNBs outside of an associated cell network based on a default cell ID or a default subframe index that is different from an actual subframe index.

10. The non-transitory computer-readable storage medium of claim 1, wherein the operations further comprise:
processing a broadcast from another eNB or gNB that is outside of an associated cell network, wherein the broadcast comprises a preamble that carries a transmission duration as a network allocation vector (NAV) and an indication of which unlicensed channels of the plurality of unlicensed channels are reserved for frequency hopping operations; and
refraining from transmitting or channel sensing operations based on the transmission duration.

11. A non-transitory computer-readable storage medium storing executable instructions that, in response to execution, cause one or more processors of an Internet of Things (IoT) device to perform operations, comprising:
performing a listen before talk (LBT) procedure on a plurality of unlicensed channels scheduled to enable a frequency hopping procedure for a transmission based on a downlink (DL) transmission;
receiving a preamble, or a CPDCCH, in a DL communication that carries a transmission duration as a network allocation vector (NAV) and further indicates which unlicensed channels of the plurality of unlicensed channels are reserved for the frequency hopping procedure, wherein the preamble, or the CPDCCH, comprises one or more orthogonal frequency division multiplex (OFDM) symbols of the DL communication and includes at least one of: an indication of an expected number of DL and uplink (UL) subframes, a duration spanning the DL communication, or another duration spanning a subset of the DL communication; and
transmitting on the plurality of unlicensed channels based on the frequency hopping procedure.

12. The non-transitory computer-readable storage medium of claim 11, wherein the LBT procedure is based on a trigger in the downlink (DL) communication, wherein the trigger indicates a duration of the transmission and the plurality of unlicensed channels to perform the frequency hopping procedure on the plurality of unlicensed channels for the transmission.

13. The non-transitory computer-readable storage medium of claim 11, wherein the operations further comprise:

in response to the LBT procedure being successful on less than all of the plurality of unlicensed channels, refraining from transmitting on any of the plurality of unlicensed channels, or transmitting on only one or more successful unlicensed channels of the plurality of unlicensed channels.

14. The non-transitory computer-readable storage medium of claim 11, wherein the operations further comprise:
deferring the transmission on an unlicensed channel of the plurality of unlicensed channels in response to the LBT procedure, and transmitting on the unlicensed channel without another LBT procedure before the transmission, or by performing a single-shot LBT procedure within a gap of a transmission opportunity duration.

15. The non-transitory computer-readable storage medium of claim 11, wherein the LBT procedure on the plurality of unlicensed channels comprises performing the LBT procedure on the plurality of unlicensed channels before a first subframe of the transmission according to a frequency hopping pattern on the plurality of unlicensed channels.

16. The non-transitory computer-readable storage medium of claim 11, wherein the LBT procedure on the plurality of unlicensed channels comprises performing the LBT procedure immediately before transmitting a scheduled subframe on an unlicensed channel of the plurality of unlicensed channels being utilized in the frequency hopping procedure.

17. The computer-readable storage medium of claim 11, wherein the operations further comprise:
reserving the plurality of unlicensed channels to enable the transmission based on the frequency hopping procedure and other transmissions by another IoT device or a user equipment (UE) within a corresponding network by transmitting; and
sharing the plurality of unlicensed channels with the another IoT device or the UE.

18. An apparatus configured to be employed in an evolved NodeB (eNB) or a next generation NodeB (gNB) comprising:
one or more processors configured to:
perform a listen before talk (LBT) operation on one or more unlicensed channels scheduled to an unlicensed internet of things (U-IoT) device to enable a frequency hopping operation for uplink (UL)/downlink (DL) transmissions;
reserve the one or more unlicensed channels for the U-IoT device to perform the frequency hopping operation based on the LBT operation; and
generate a preamble, or a conventional/common physical downlink control channel (CPDCCH), in a DL communication that carries a transmission duration as a network allocation vector (NAV) and further indicates which unlicensed channels of the one or more unlicensed channels are reserved for the frequency hopping operation, wherein the preamble, or the CPDCCH, comprises one or more orthogonal frequency division multiplex (OFDM) symbols of the DL communication and includes at least one of: an indication of an expected number of DL and uplink (UL) subframes, a duration spanning the DL communication, or another duration spanning a subset of the DL communication; and
a radio frequency (RF) interface, configured to send, to RF circuitry, data for a DL transmission that schedules the one or more unlicensed channels for transmission by the U-IoT device.

19. The apparatus of claim 18, wherein the CPDCCH or the preamble of the DL transmission that carries the transmission duration as the NAV is configured to trigger or notify the U-IoT device of the one or more unlicensed channels successfully reserved for the frequency hopping operation.

20. The apparatus of claim 19, wherein the preamble, or the CPDCCH provides notice to the U-IoT device for an associated transmission or to other eNBs/gNBs neighboring an associated cell network to refrain from transmitting or channel sensing based on the indication, the duration or the another duration.

21. The apparatus of claim 19, wherein the one or more processors are further configured to:
map one or more resource elements (REs) of one or more reference signals RSs including at least one of: a cell specific reference signal (CRS), a channel state information reference signal (CSI-RS), or a demodulation reference signal (DMRS), and one or more synchronization signals in the preamble or the CPDCCH based on a default Cell-ID or a default subframe index.

22. The apparatus of claim 18, wherein the one or more processors are further configured to:
process a broadcast from another eNB or gNB that is outside of an associated cell network, wherein the broadcast comprises a preamble that carries a transmission duration as a NAV and an indication of which unlicensed channels of the one or more unlicensed channels are reserved for frequency hopping operations; and
refrain from transmitting or channel sensing operations based on the transmission duration.

23. The apparatus of claim 19, wherein the one or more processors are further configured to:
schedule one or more IoT devices, one or more user equipments (UEs), or both the one or more IoT devices and one or more UEs, to share the one or more unlicensed channels via the preamble or the CPDCCH.

* * * * *